April 16, 1957  K. G. SPEITH ET AL  2,789,046
PROCESS OF MAKING STEEL FROM PIG IRON
Filed Feb. 1, 1955  3 Sheets-Sheet 1

INVENTORS
KARL GEORG SPEITH
OTTO DARMANN
BY HANS VOM ENDE
Campbell Brumbaugh Free &cows
their ATTORNEYS

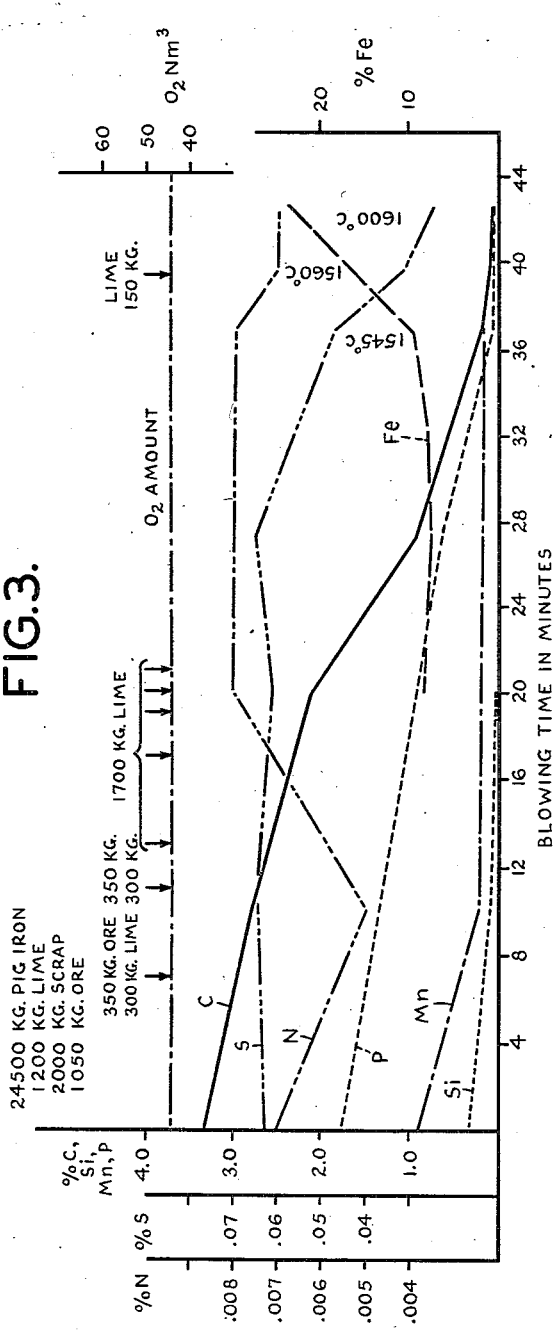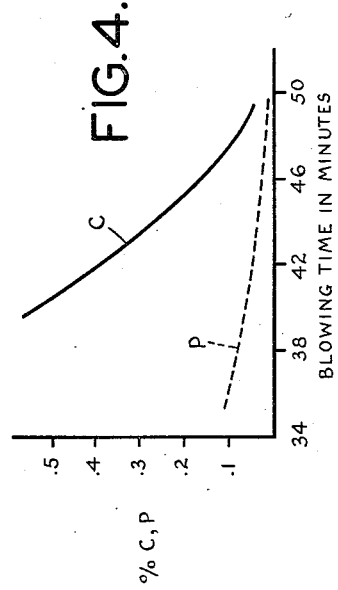

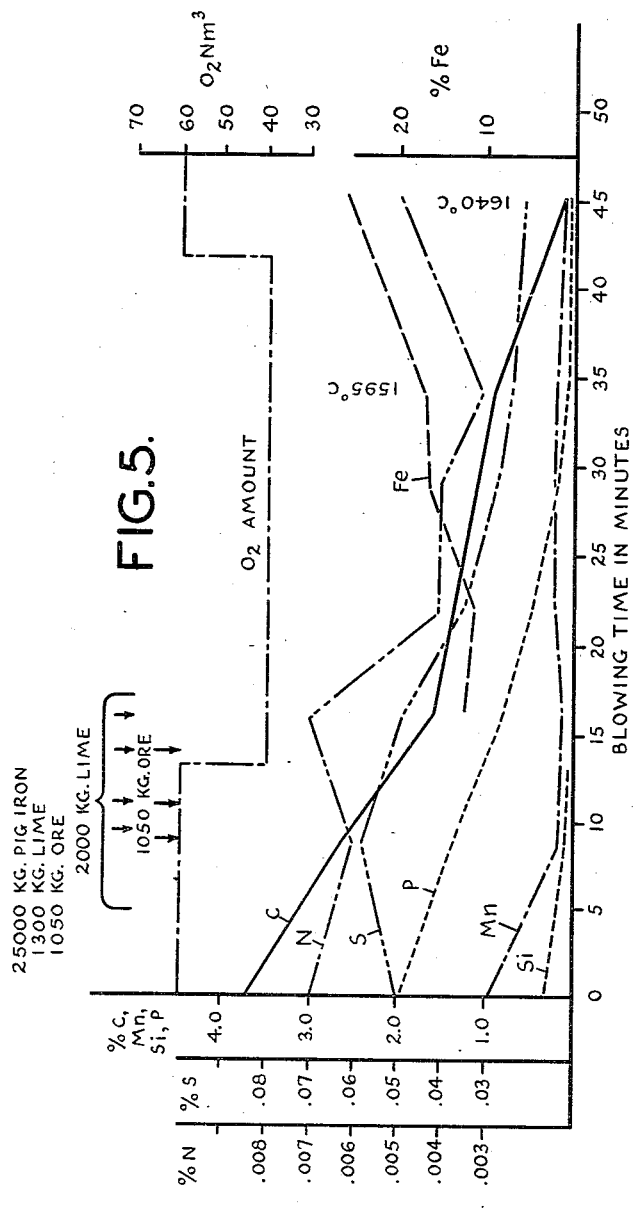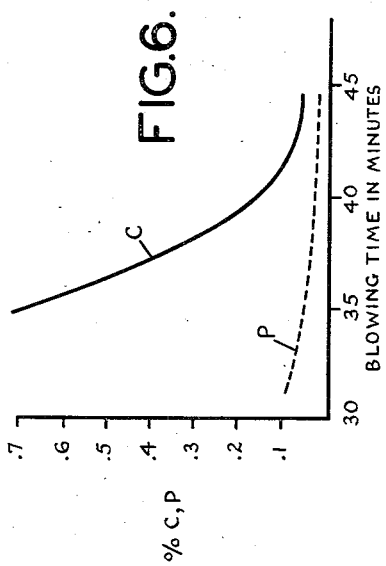

United States Patent Office 2,789,046
Patented Apr. 16, 1957

2,789,046
PROCESS OF MAKING STEEL FROM PIG IRON

Karl Georg Speith, Duisburg-Huckingen, Otto Därmann, Duisburg, and Hans vom Ende, Duisburg-Ungelsheim, Germany, assignors to Mannesmann Aktiengesellschaft, Dusseldorf, Germany, a corporation of Germany Application February 1, 1955, Serial No. 485,506

8 Claims. (Cl. 75—52)

This invention relates to the manufacture of steel and purified iron from pig iron and the like and it relates particularly to an improved method of producing high quality steel or technically pure iron by blowing pig iron and the like with substantially pure oxygen.

Since the development of the Bessemer process of converting pig iron to steel, it has been proposed at various times to use, and methods have been provided for using, substantially pure oxygen in the blowing of Bessemer converters. The use of technically or substantially pure oxygen (98% to 100%) in a Bessemer converter has proved to be impractical because of destruction of the tuyeres or blowing pipes in the bottom of the converter. However, this problem has been solved heretofore by introducing substantially pure oxygen into the converter through water-cooled pipes or ordinary pipes which are spaced from the surface of the molten pig iron (top blown) or disposed partially below the surface of the heat (side blown) in order to direct the oxygen into contact with the molten metal and thereby oxidize and remove impurities from it in conjunction with slag formed on the top of the metal. In actual practice, the earliest efforts to produce steel by the top blowing of the molten pig iron with oxygen were successful only with the pig irons of a type containing only a relatively small proportion of phosphorous, that is, a maximum of about 0.1 to 0.2% of phosphorous.

It is also possible to treat pig irons containing as high as 0.5% phosphorous by surface-blowing of the molten pig iron with oxygen, provided the pig iron is treated in relatively small quantities, that is, in batches or heats of not more than one ton. With such small heats it is relatively easy to reduce the phosphorous content of the pig iron to about 0.04% without decreasing the carbon content below 1% by maintaining a relatively low rate of supply of oxygen and by adding basic slag forming materials in accordance with the general practice used in the Thomas process. Also, dephosphorization is aided in the small batch process by maintaining relatively low temperatures. One major difficulty in practicing the small batch process is that it requires very accurate temperature control because a few degrees variation in temperature at the end of the blowing period exerts a considerable influence on the phosphorous content.

These prior methods of oxygen-blast refinement of high phosphorous-containing irons are not practical for the refinement of pig iron in large quantities, that is, in heats on the order of 25 to 30 tons, because the oxygen supply would have to be so great as to render its use exorbitantly expensive. Moreover, the prior treatments with surface blown oxygen almost completely removed the carbon by the time the phosphorous content of the resulting steel was reduced to a satisfactorily low value, e. g., approximately 0.04%, thereby affording no control of carbon content and the desired degree. For these reasons, the prior processes are not economically adapted to or practical for mass production operation.

In accordance with the present invention, we have provided a method of producing steel or even technically pure iron from pig iron which contains as high as 2% phosphorous or even higher. The method of this invention involves the control of the rate of blowing of the charge with substantially pure oxygen to effect a controlled oxidation and removal of carbon and phosphorous whereby the phosphorous content of the resulting iron or steel product will be reduced to about 0.04% or less while retaining a carbon content between about 0.06% and 1% in the product. It has been found that excellent steel having a carbon content of 0.06% can be produced from high phosphorous irons, such as Thomas iron, and that, if desired, the carbon and other impurities can be reduced by further controlled blowing with oxygen to such a degree that technically pure iron is obtained.

More particularly, the method of this invention involves the blowing of molten pig iron in a crucible with substantially pure oxygen by introducing the oxygen through one or more pipes at a relatively high initial rate in order to reduce the carbon content of the pig iron quickly and, at the same time, avoid excessive foaming or frothing of the slag. The use of a high blowing rate together with the introduction of proper slag-forming materials not only causes a sharp reduction of the carbon content but also maintains the phosphorous content well below the carbon content. The blowing operation involves a later step of blowing at a reduced oxygen rate to promote the dephosphorization of the melt and it, in turn, is followed by a blowing at higher oxygen volume or rate to further decarburize and reduce the phosphorous content to the value desired.

The method of this invention may also include a further treatment at reduced oxygen feed rate in the presence of the newly formed slag in order to further remove unwanted impurities and, if desired, produce a technically pure iron.

For a better understanding of the advantages of the present invention over other methods of blowing the molten pig iron, reference may be had to the accompanying drawings in which:

Fig. 3 is a chart illustrating the purification of pig iron by blowing with substantially pure oxygen at a continuous rate of flow of oxygen but at a lower rate than that shown in Fig. 1;

Fig. 4 is a chart illustrating the average reduction of the carbon and phosphorous contents based on a large number of pig iron heats treated in the manner shown in Fig. 3;

Fig. 5 is a chart illustrating the reduction of the impurities in a charge of pig iron which is blown with substantially pure oxygen in accordance with the present invention; and Fig. 6 is a chart illustrating the average reduction in phosphorous and carbon content of a large number of pig iron heats treated in accordance with the present invention.

Figure 1:
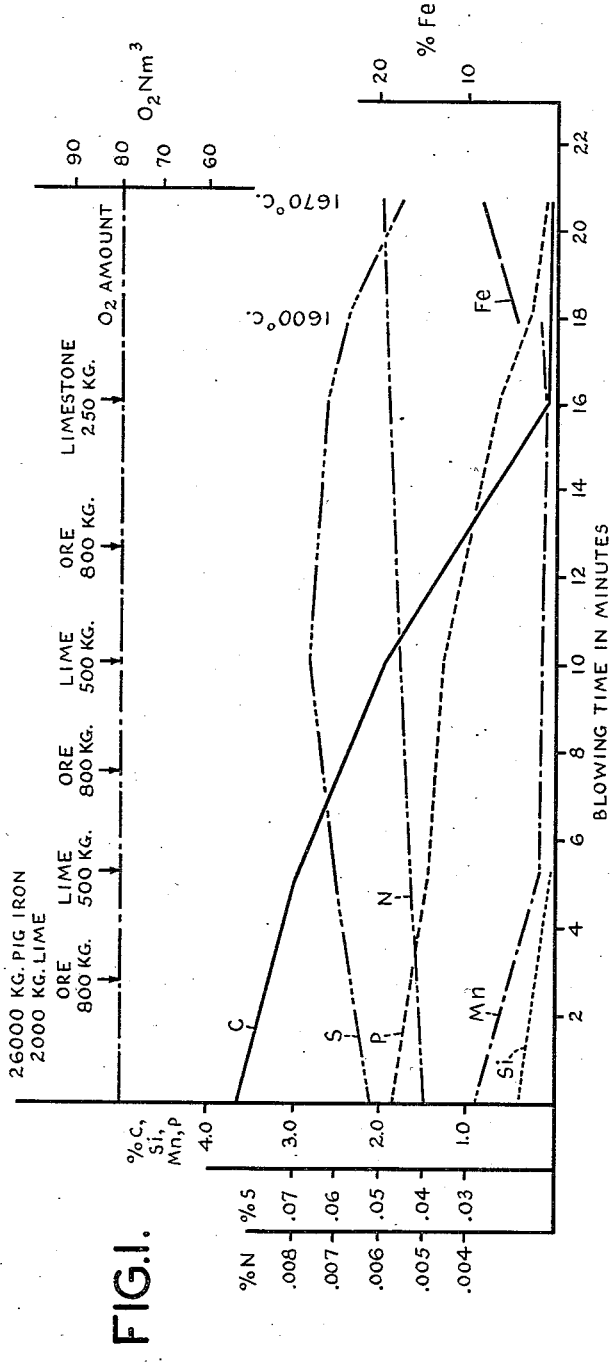
Figure 1 is a chart containing curves illustrating the purification of a pig iron charge by blowing the charge with substantially pure oxygen at a relatively high, fixed rate.

The method embodying the present invention can be practiced with conventional equipment, such as, for example, a crucible or converter-shaped vessel having a basic lining of the type ordinarily used for the treatment of pig irons of high phosphorous content. The molten pig iron can be charged into the open top of the converter or crucible from a ladle and slag-forming elements or any desired scrap metal can be similarly introduced in solid form through chutes in the conventional way.

The substantially pure oxygen, preferably containing no nitrogen and less than one percent of inert gases, is introduced into the charge through a centrally positioned vertical lance or pipe which may be water-cooled, if desired. The oxygen lance or pipe is preferably formed of copper and has a nozzle provided with a Laval or venturi restriction therein for regulating the velocity and rate of oxygen flow through the nozzle or pipe. A suitable diameter for the nozzle restriction is about one and one-half inches, although a variation in the diameter can be made, as desired. The pressure under which the substantially pure oxygen is admitted through the pipe varies between 12 atmospheres and 4 atmospheres gauge, depending upon the desired volume of the oxygen to be admitted.

It has been found that the spacing of the nozzle from the theoretical or quiescent surface of the charge is of considerable importance and that under no circumstances should the nozzle be immersed in the molten pig iron. Space should be left between the nozzle and the quiescent surface of the molten metal for formation of a layer of slag. This space should be a minimum of about 20 inches. In most instances, best results are attained with a spacing of about 32 inches or more between the top of the nozzle and the quiescent level or surface of the molten metal.

The rate at which the oxygen is blown into the converter against the surface of the molten charge therein is extremely important in controlling the rate of decarburization and dephosphorization and in controlling the final analyis of the resulting steel or other purified iron product. The importance of control of admission of the oxygen is shown in the drawings in conjunction with the description of typical methods which illustrate the advantages of the process. All of the iron-refining operations described hereinafter were conducted with pig iron containing approximately 3.5% carbon; 0.4% silicon; 1% manganese; 2% phosphorous; 0.05% sulfur and 0.007% nitrogen. Each of the heats consisted of another bath of twenty-five to twenty-six tons of pig iron. Suitable slag-forming components are added to the bath, for example, lime, iron ore, mill cinder, mill scale, limestone, scraps and other agents influencing the formation of slag and cooling of the bath. The manner in which the slag-forming components are added is indicated on each of charts of Figs. 1, 3 and 5.

Figure 2:
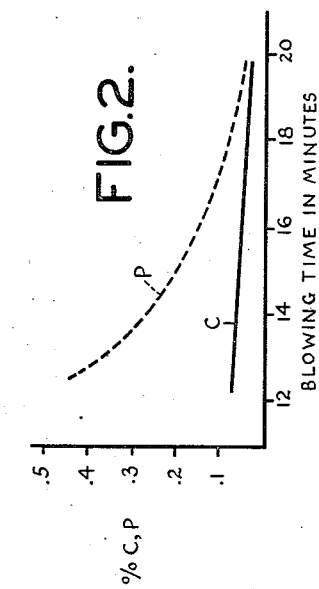
Fig. 2 is a chart illustrating the average decrease in the phosphorous and carbon content of a large number of charges treated in the manner indicated in the chart of Fig. 1.

Referring now to Fig. 1, the curve there shown is based on introduction of substantially pure oxygen into the above-described molten charge, through a nozzle of the type described, spaced approximately 32 inches above the surface of the melt, and at the rate of 80 cubic meters of oxygen per minute. This amounts to approximately 3.2 cubic meters of oxygen per minute per ton of pig iron these quantities being based on a volume at 0° C. and a pressure of one atmosphere gauge, frequently referred to as "normal" volume. It will be seen by reference to Fig. 1, that decarburization of the pig iron occurs at a very high rate so that at the end of about thirteen minutes of blowing, the carbon content of the heat is reduced to the same value as the phosphorous content and ultimately in decreased below and remains below the phosphorous content of the resulting product. This method of blowing has the advantage of suppressing foaming of the slag and reduction of the nitrogen control of the steel. However, the ultimate result is approximately the same as that obtained with the Thomas method, that is, with a bottom blown basic converter, in that the phosphorous content of the final product always exceeds the carbon content which is undesirable for most grades of steel and hence requires further refining to reduce the phosphorous content. This relatively high phosphorous and carbon relation obtained under the conditions of Fig. 1 is shown in the curves of Fig. 2 of the drawings. These curves of Fig. 2 are based on an average of twenty-five heats conducted under the condition shown in Fig. 1.

Somewhat different results are obtained by utilizing a lower blowing rate with substantially pure oxygen over a longer period of time, as shown in Figs. 3 and 4. In this operation, pig iron of the same above-described composition was subjected to blowing with substantially pure oxygen through a nozzle of the type described, spaced about 32 inches above the equiescent surface of the molten pig iron. Oxygen was introduced at the rate of 40 normal cubic meters per minute, that is, approximately 1.6 cubic meters per minute per ton of a 25 ton pig iron charge. The blowing was continued until the phosphorous content reached an acceptable value of approximately 0.04%. In this method, the phosphorous content remains below the carbon content throughout the entire blowing period and a satisfactory product is produced. However, the blowing period must be greatly prolonged as indicated in Figs. 3 and 4 and, moreover, great difficulty is encountered during the initial stages of the blowing because of excessive foaming of the slag resulting from the violent ebullition of the bath. With pig irons containing on the order of one and one-half percent of carbon or more, intensive foaming occurs, the slag often boiling out of the mouth of the crucible or converter and frequently requiring reduction of the blowgrate or stoppage of the blowing operation in order to avoid damage to property and injury to personnel. This results in considerable variation in the final composition of the metal undergoing treatment as well as slag encrustation of the mouth of the converter and adjacent areas.

We have discovered that the disadvantages of the blowing operations described above can be overcome according to the method of the present invention in the manner illustrated by the curves of Figs. 5 and 6 of the drawing. In accordance with this method, oxygen is introduced at the rate of 60 normal cubic meters per minute, i. e., 2.4 cubic meters per minute, per ton of a 25 ton pig iron charge, through a blowing nozzle spaced 32 inches from the surface of the bath of the above composition. Blowing at this high rate is continued for about thirteen to fourteen minutes thereby causing a high rate of carbon combustion accompanied by simultaneous dephosphorization. Most importantly, the high rate of oxygen feed suppresses the formation of foam so that foaming of the slag to any undesirable extent is overcome. This at least in part is caused by breaking of the foam by the blast from the nozzle. Foaming can, of course, be further suppressed by the introduction of recognized foam-suppressing material, such as alkali metal and alkaline metal halides, lime dust, bauxite or sand. After the initial blowing period at about 60 normal cubic meters per minute (2.4 nm.³/min./t.), the blowing rate is reduced to about 40 normal cubic meters per minute (1.6 nm.³/min./t.), during which dephosphorization continues at a fairly high rate of speed and whereas the carbon combustion continues at a lower rate of speed than during the high blowing period, thereby maintaining the phosphorous content of the bath at all times less than the carbon content.

At the end of about forty-one to forty-two minutes of oxygen blowing at the 40 cubic meters per minute, the blowing rate is again increased to approximately 60 cubic meters per minute in order to increase the carbon combustion rate so as to sharply reduce the carbon content of the bath. It will be seen that when the carbon content is reduced to approximately 0.9%, the phosphorous content has been reduced to a satisfactory value of 0.04%. At this time, the melt or bath can be slagged off and additional slagging material added to further purify the steel to the composition if desired.

The above-described operation enables the production of a low phosphorous steel having a satisfactory carbon content and which can be processed in large heats for casting without danger of excessive foaming and without requiring excessively long periods for blowing the heat. The method also enables a flexible control of the heating operation, because it permits without loss of close control substantial variation in the rate of oxygen feed to obtain and maintain the best conditions in the melt. For example, the rate of oxygen feed during the initial and final stages of blowing can be ranged between about 2.4 and and 3.2 normal cubic meters per minute per ton, while the lower rate blow can be varied between about 1.2 and 1.6 normal cubic meters per minute per ton. Variation in the blowing technique by adjustment of the blowing nozzle or the use of several nozzles to regulate the blowing rate is also possible. Thus, during the low rate blowing operation, the nozzle can be raised or backed off to a spacing of 35 to 40 inches. Two or more nozzles of different sizes alternately may be used to obtain the different rates or a plurality of nozzles may be used simultaneously at the same or different spacings from the bath and one or more of them may be shut off to vary the blowing rate or the area being blown, to obtain the different blowing rates described herein. Furthermore, auxiliary nozzles, additional to the blast nozzle, may be employed at lower pressure to blow oxygen in the surface of the slag oxidant and reduce foaming of the slag.

Moreover, if desired, and in order to conserve heat, oxygen can be introduced into the top portion of the crucible or converter through a separate nozzle in order to convert the carbon monoxide evolving from the bath to carbon dioxide, with the attendant exothermic reaction, which naturally reduces the volume of gases from that resulting from the combustion of the carbon monoxide in the atmosphere above the converter and also renders dust removal easier from the smaller volume of gas carrying the dust.

Illustrative of the quality of steel that can be produced in accordance with the present method, analyses of approximately one hundred ingots produced from pig iron of the afore-mentioned composition treated in accordance with the method described above and disclosed in Figs. 5 and 6, showed the following average analyses of the ingots:

| | Percent |
|---|---|
| Carbon | 0.12 |
| Manganese | 0.42 |
| Phosphorous | 0.037 |
| Sulfur | 0.016 |
| Nitrogen | 0.005 |

The analyses of the heats before tapping showed the following average values:

| | Percent |
|---|---|
| Carbon | 0.10 |
| Manganese | 0.15 |
| Phosphorous | 0.035 |
| Sulfur | 0.018 |
| Nitrogen | 0.005 |
| Oxygen | 0.035 |

The amount of impurity in the final product can be further reduced by continuing the blowing operation with a very low rate of oxygen supply, for example, below one normal cubic meter per minute of oxygen per ton of pig iron. The purpose of this operation is to continue the slow reduction of the carbon content of the bath which also affects the oxygen content and the non-metallic components of the finished steel. It is a recognized fact that a low rate of oxidation at the end of the heat goes hand in hand with a low oxygen content in the liquid steel. For this reason, it is advantageous to slag the metal toward the end of, or subsequent to the final strong blasting of the metal. After the addition of fresh slag forming materials, the heat can be further oxidized by blowing it with oxygen of the above-specified low oxygen rate. The low rate of oxygen supply and the correspondingly slow speed of oxidation may require additional heat to be supplied from the outside to maintain a proper temperature in the bath. This may be accompanied by electrical induction or flame heating, as desired. The use, for example, of a gas or oil burner flame directed onto the surface of the bath offers the advantage of creating an oxidizing atmosphere which may enable the amount of pure or technically pure oxygen to be reduced or dispensed with during the final oxidation treatment.

In this way, if the final blowing is continued and a relatively low temperature maintained in the bath by the addition of slag-forming and cooling agents, it is possible to produce substantially pure iron from pig irons of relatively high phosphorous content. For example, pig iron containing 3.66% carbon; 0.31% silicon; 0.87% manganese; 1.67% phosphorous and 0.076% sulfur, and utilizing 4 tons of quick lime and 2.4 tons of ore as slag-forming agents has been treated in the manner shown in Fig. 5 followed by low rate oxidation to produce iron containing 0.02% carbon; 0.0% silicon; 0.06% manganese; 0.023% phosphorous; 0.026% sulfur and 0.005% nitrogen, which corresponds to technically pure iron (99.8% iron).

The above-described method provides a commercially practical means for producing high quality steels or technically pure iron from high phosphorous ores which could not be treated in commercial quantities to produce steels of the properties produced herein. In fact, the present steels are comparable to the finest grades of open hearth steels and yet they can be produced in a much shorter time with equipment of greatly simplified and far less costly nature.

It will be understood that the method is susceptible to considerable variation in the type of pig iron treated, the slag-forming components added during the blowing of the charge and in size of the charge and its related blowing rates. Therefore, the methods described herein should be considered as illustrative and not as limiting the scope of the following claims.

We claim:

1. A method of manufacturing steel with low phosphorous, nitrogen, sulfur and oxygen contents, from a bath of liquid pig iron containing at least 0.2% phosphorous, and having slag-forming ingredients associated therewith in said bath, comprising initially blowing substantially pure oxygen against the surface of the bath through a nozzle spaced from the surface of the bath a minimum distance of 20 inches, the oxygen being supplied at a rate high enough to suppress foaming of slag on said bath and to react with the molten bath in cooperation with the slag, thereby causing slagging of the phosphorous and reducing it to a content of about 0.2%, while the carbon content remains at about 1.5%, and thereafter decreasing the oxygen supply rate to further reduce the phosphorous and carbon content of the bath while maintaining the carbon content greater than the phosphorous content.

2. The method set forth in claim 1, in which said initial blowing is between about 2.4 and about 3.2 normal cubic meters per minute per ton of pig iron and the decreased oxygen rate supply is between about 1.2 and about 1.6 normal cubic meters per minute per ton of pig iron.

3. The method set forth in claim 1, in which the oxygen is blown through a nozzle spaced between about 20 and 40 inches from the surface of the bath.

4. A method of manufacturing steel with low phosphorous, nitrogen, sulfur and oxygen contents, from liqiud pig iron containing at least 0.2% phosphorous, comprising initially blowing substantially pure oxygen against the surface of the bath through a nozzle spaced at least 20 inches from the surface of the bath, said blowing including applying a high oxygen rate at the start of the oxidation period until a carbon content of approximately 1.5% has been reached, reducing the oxygen blowing rate until phosphorous content of the bath is reduced to below 0.2% and carbon content to approximately 0.9%, and thereafter blowing the bath at a high oxygen rate causing the carbon to be decreased to the desired end value and during the first half of the total blowing period introducing slag-forming materials to the bath to influence formation of slag and cooling of the bath.

5. The method of manufacturing steel set forth in claim 4, in which the oxygen is blown through a plurality of nozzles and some of said nozzles are directed against the slag to keep the formation of slag foam as low as possible and to reduce the formation of foaming slag, respectively.

6. The method of manufacturing steel set forth in claim 4, in which the oxygen is directed against the surface of the bath through a plurality of nozzles having different diameters.

7. The method of manufacturing steel set forth in claim 4, in which the period of increased blowing rate is followed again by blowing with a very low oxygen rate during which heat is supplied to the bath to maintain the temperature therein and allow the oxygen to reduce the amount of impurities left in the bath to a minimum.

8. The method set forth in claim 4, in which said initial blowing rate is between about 2.4 and about 3.2 normal cubic meters per minute per ton of pig iron and the decreased oxygen supply rate is between about 1.2 and about 1.6 normal cubic meters per minute per ton of pig iron.

References Cited in the file of this patent

UNITED STATES PATENTS

| | | |
|---|---|---|
| 1,032,653 | Brassert | July 16, 1912 |
| 2,584,152 | Morrison | Feb. 5, 1952 |